United States Patent [19]

Brown, Jr. et al.

[11] 4,007,826
[45] Feb. 15, 1977

[54] DUAL PRESSURE TAKE-UP APPARATUS AND SYSTEM FOR DUAL BELT CONVEYOR-ELEVATOR

[75] Inventors: Scott L. Brown, Jr.; Klaus Bremer, both of Aurora, Ill.

[73] Assignee: Stephens-Adamson, Inc., Aurora, Ill.

[22] Filed: Apr. 2, 1976

[21] Appl. No.: 673,201

[52] U.S. Cl. ............. 198/813; 74/242.1 FP; 74/242.11 R; 91/32; 91/29; 214/14
[51] Int. Cl.² ........................ B65G 15/30
[58] Field of Search ........ 214/14, 15 R, 15 D; 198/40, 165, 208, 232, 573, 604, 605, 626, 856, 813, 162; 91/28, 29, 32; 74/242.8, 242.9, 242.1 FP, 242.11 R

[56] References Cited

UNITED STATES PATENTS

| | | | |
|---|---|---|---|
| 2,741,478 | 4/1956 | Mercier | 91/29 |
| 3,701,414 | 10/1972 | Mayer et al. | 198/856 |
| 3,776,098 | 12/1973 | Behrens | 91/29 |
| 3,777,879 | 12/1973 | Dehne | 198/813 |
| 3,780,755 | 12/1973 | Matsuda et al. | 91/29 |
| 3,805,946 | 4/1974 | Yateman et al. | 198/605 |

Primary Examiner—Robert W. Saifer
Assistant Examiner—Joseph E. Valenza
Attorney, Agent, or Firm—Robert C. Sullivan

[57] ABSTRACT

A conveyor apparatus for elevating loose bulk material from one level to another, as in self-unloading ships, and more particularly a dual belt conveyor-elevator having a relatively long horizontal feed section, and further including a belt take-up apparatus and system including a normal pressure mode for tensioning the outer belt of the dual belt conveyor-elevator under normal operating conditions, the belt take-up apparatus and system also including a high pressure mode which is connected in tensioning relation to the outer belt of the dual belt conveyor-elevator upon loss of motive driving power to the dual belt conveyor-elevator. The high pressure mode is capable of substantially immediately taking up slack which develops in the outer belt, particularly in the horizontal feed portion thereof, with consequent prevention of spillage of load material, when the driving power for the dual belt conveyor-elevator is interrupted.

23 Claims, 3 Drawing Figures

DUAL PRESSURE TAKE-UP APPARATUS AND SYSTEM FOR DUAL BELT CONVEYOR-ELEVATOR

BACKGROUND OF THE INVENTION

1. Field of the Invention

This invention relates to conveyor apparatus for elevating loose bulk material from one level to another and in particular to conveyor apparatus which can be used in relatively confined spaces, as for example, in self-unloading ships, and more particularly to a dual belt conveyor-elevator including a belt take-up apparatus and system including a normal pressure mode for tensioning the outer belt of the dual belt conveyor-elevator under normal operating conditions, and which belt take-up apparatus and system also includes a high pressure mode which develops in the outer belt when the driving power for the dual belt conveyor-elevator is interrupted.

2. Description of the Prior Art

The present invention relates to a dual belt conveyor-elevator such as that illustrated in U.S. Pat. No. 3,805,946 issued to Earl W. Yateman et al. on Apr. 23, 1974, for example.

The aforementioned U.S. Pat. No. 3,805,946 to Yateman et al. comprises a pair of endless belt conveyors, the forward runs of which are juxtaposed in face-to-face edge sealing relation to define a tubular carrier wherein the material being conveyed is clamped between the belts. One belt conveyor (i.e., the "outer" belt conveyor) includes a substantially horizontal, upwardly facing entry portion, an upwardly inclined, downwardly facing terminal portion, and a concavely curved intermediate portion, the entry portion being troughed. The other belt conveyor (i.e., the "inner" belt conveyor) includes a downwardly facing entry portion defining with the entry portion of the first conveyor a bight between the conveyors, an upwardly inclined, troughed, upwardly facing terminal portion, and a convex intermediate portion. Each belt over the upwardly facing portion of its forward run serves as troughed conveyor, and each belt over the downwardly facing portion of its forward run serves as a retainer or hugger belt engaging the troughed carrier portion of the other belt. During normal operation, both belts are maintained in tension by automatic tensioning means.

One problem which may be encountered in the operation of the belt conveyor apparatus of the type shown in the aforementioned U.S. Pat. No. 3,805,946 to Yateman et al., particularly conveyors of this type operating at a higher speed and capacity, is that if the source of driving power of the conveyor is stopped (the outer conveyor belt usually being connected to the source of motive power), while the conveyor is still loaded, the load of material on the substantially horizontal run portion of the outer conveyor belt possesses inertia tending to keep this portion of the outer conveyor belt coasting forward after the source of driving power has been interrupted. While the "coasting" problem is most acute when the lower loading portion of the outer conveyor belt is absolutely horizontal, the coasting problem will still exist for outer conveyor belts having loading portions which are inclined at limited angles upwardly from the horizontal, and the present invention is intended to include any such departures from the horizontal, (defined as being included in the terminology "substantially horizontal"), in which a coasting problem still exists. The upwardly extending portion of the outer conveyor belt beyond the "bight" of the inner and outer conveyor belts also has inertia which tends to cause a coasting of this upwardly inclined portion of the outer conveyor belt, but the coasting tendency of the upwardly inclined portion of the outer conveyor belt is much less than that of the horizontally extending portion of the outer conveyor belt, since the upwardly inclined portion of the outer conveyor belt must help lift the load as it coasts. The net result of this difference in coasting tendencies subsequent to power shutdown of the aforementioned two portions of the outer conveyor belt tends to create slack or reduced tension in the outer conveyor belt at or near the region where the inner and outer conveyor belts come together to define the "bight" portion of the two cooperating belts. The tendency to produce slack in the outer conveyor belt near the bight portion of the two cooperating belts, as just described, may tend to cause spillage in this region of the material being conveyed.

The conveyor unloading system of a ship is generally operated from an independent diesel engine generator which is supplied solely for this purpose and which is independent of other electrical power of the ship.

The dual pressure take-up arrangement for a belt elevator as disclosed in the present application is applicable for use in an "emergency" situation in which the conveyor is stopped by pulling the emergency stop cords, with the conveyor still being fully loaded; and is also applicable for operation during routine stopping, since in many instances the entire conveyor system may have to be shut down because of the overloading of the receiving facilities on shore. While this latter situation would not be designated as an "emergency" stop, nevertheless it means stopping the conveyors fully loaded.

OBJECTS OF THE INVENTION

Accordingly, it is an object of the present invention to provide a belt tensioning or take-up apparatus and system for use with a dual belt conveyor-elevator wherein the outer belt of the loop is a continuation of and includes the horizontal feeder conveyor, in which said belt tensioning apparatus and system is effective substantially immediately upon power shutdown of the dual belt conveyor-elevator to apply a tensioning force to the outer belt which is substantially greater than the normal tensioning force, whereby to take up slack in the outer belt resulting from reactions occurring on the outer belt due to shutdown or loss of driving power thereof.

It is another object of the present invention to provide a belt tensioning or take-up apparatus and system for use with a dual belt conveyor-elevator wherein the outer belt is a continuation of and includes the horizontal feeder conveyor, in which said belt tensioning apparatus and system is effective substantially immediately upon power shutdown of the dual belt conveyor-elevator to apply a tensioning force to the outer belt which is substantially greater than the normal tensioning force, whereby to decelerate the horizontal feed portion of the conveyor and eliminate accumulated slack, particularly in the horizontal feed portion, and to bring the dual belt conveyor-elevator to a stop without spillage of load material.

It is a further object of the invention to provide in conjunction with a dual belt conveyor-elevator a belt tensioning or take-up apparatus and system wherein during normal operation of the conveyor-elevator the belt tensioning apparatus and system applies a normal tensioning force to the take-up pulley which engages the outer belt of the conveyor-elevator, and wherein upon loss of driving power to the dual belt conveyor-elevator, the belt tensioning apparatus and system is automatically and substantially immediately converted to a high pressure mode in which it applies a substantially increased tension to the take-up pulley which engages the outer belt of the conveyor-elevator, whereby to take up any slack in the outer belt resulting from power shutdown of the conveyor-elevator.

It is another object of the invention to provide a dual pressure take-up system for a belt elevator which is "fail-safe" in the event of a complete power failure, or other interruption of the power supply system which supplies electrical power to the conveyor system, to the solenoid valves, and to the electric motors for the hydraulic pumps associated with the conveyor system.

In achievement of these objectives, there is provided in accordance with an embodiment of the invention a conveyor apparatus for elevating loose bulk material from one level to another, as in self-unloading ships, and more particularly a dual belt conveyor-elevator having a relatively long horizontal feed section, and further including a belt take-up apparatus and system including a normal pressure mode for tensioning the outer belt of the dual belt conveyor-elevator under normal operating conditions, the belt take-up apparatus and system also including a high presure mode which is connected in tensioning relation to the outer belt of the dual belt conveyor-elevator upon loss of motive driving power to the dual belt conveyor-elevator. The high pressure mode is capable of substantially immediately taking up slack which develops in the outer belt, particularly in the horizontal feed portion thereof, with consequent prevention of spillage of load material when the driving power for the dual belt conveyor-elevator is interrupted.

Further objects and advantages of the invention will become apparent from the following description taken in conjunction with the accompanying drawings in which:

DESCRIPTION OF THE PREFERRED EMBODIMENT

Figure 1:
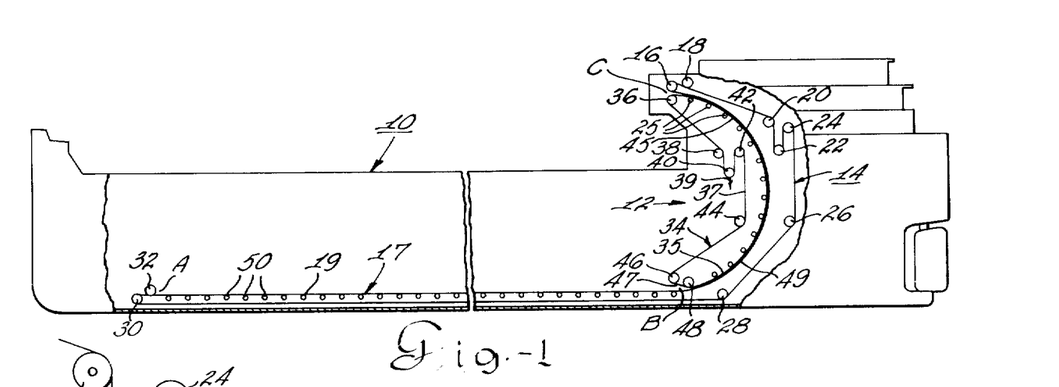
FIG. 1 is a diagrammatic view of a dual belt conveyor-elevator installed in a self-unloading ship.

Referring now to FIG. 1, there is shown a self-unloading ship generally indicated at 10 which carries a cargo of loose bulk material such as mineral ore or the like. Ship 10 is provided with the dual belt conveyor-elevator generally indicated at 12 which, except for the dual pressure belt slackness take-up apparatus and system in accordance with the present invention, may, for example, be generally similar to the dual belt conveyor-elevator described in the aforementioned U.S. Pat. No. 3,805,946 issued to Earl W. Yateman et al. on Apr. 23, 1974. The outer belt of the dual belt conveyor-elevator is generally indicated at 14 and passes around pulleys 16, 18, 20, 22, 26, 28, 30 and 32, outer belt 14 being driven by pulley 16, and pulley 22 being the take-up pulley by means of which tension is applied to outer belt 14. The inner belt of the dual belt conveyor-elevator is generally indicated at 34 and operates around pulleys 36, 38, 40, 42 44, 46 and 48. Inner belt 34 is driven by friction between outer belt 14 and inner belt 34. However, the friction of the load material trapped between the belts also serves as an aid in frictionally driving inner belt 34. Pulley 40 is the take-up pulley by means of which tension is applied to inner conveyor belt 34.

In some cases, additional positive drive means may be applied to pulley 36 of inner belt 34 to assure that there is no slippage between the outer and inner conveyor belts 14 and 34.

The particular pulley arrangement shown in the drawings of the present application and described in the present specification is a typical arrangement only, and other arrangements can be used.

Outer belt conveyor 14 is provided with a relatively long, substantially horizontal feeder portion, generally indicated at 17, the upper run 19 of which is supported for substantially its entire length by troughing rollers indicated at 50 similar to those shown in the aforementioned U.S. Pat. No. 3,805,946 to Yateman et al.

The inner belt conveyor 34, which is preferably from four to eight inches wider than the outer belt conveyor 12, includes a forward run 35 which extends around the pulleys 36 and 48 which are disposed at the higher and lower levels, respectively, the forward run 35 of inner belt conveyor 34 running in juxtaposed face-to-face relation with the upwardly extending portion of the forward run of outer belt conveyor 14. Inner belt conveyor 34 also includes a return run 37 which passes over the take-up pulley 40, and in order to compensate for belt stretch and to maintain inner belt conveyor 34 in tension at all times, the return run 37 of inner belt conveyor 34 is connected to a suitable tensioning device indicated by the arrow 39 extending downwardly from take-up pulley 40. The tensioning device 39 may be a hydraulic ram mechanism which may maintain a substantially constant belt tensioning force on take-up pulley 40 associated with inner belt conveyor 34. The construction and operation of the tensioning device 39 associated with take-up pulley 40 forms no part of the present invention.

The forward run of inner belt conveyor 34 includes a short, downwardly facing entry portion 47 which defines with the horizontal upper run portion 19 of outer belt conveyor 14 a bight through which the material being conveyed passes between the outer and inner conveyor belts 14 and 34, respectively, to be clamped thereby.

The greater part of the length of forward run 35 of inner belt conveyor 34 is supported by a series of troughing rollers 25 so as to define for the inner conveyor belt 34 a convex curve having an upwardly inclined upwardly facing terminal portion 45 of large radius and a downwardly facing intermediate curve portion 49 of smaller radius. It will be noted that the load material-engaging surface of inner conveyor belt 34 passes from a downwardly facing configuration 47 at the entry portion or bight contiguous point B (FIG. 1) to a troughed upwardly facing configuration at the terminal portion 45 of inner conveyor 34.

The material to be conveyed, such as mineral ore or the like, is fed to the upper run 19 of substantially horizontal feeder portion 17 of outer conveyor 14 between the points A and B (FIG. 1) by some externally controlled device. When the material conveyed reaches point B, which is substantially the location of the bight portion between the inner and outer conveyor belts 34 and 14, the material is trapped between the two belts and is elevated to a point C contiguous the pulleys 16 and 36, where the material is discharged onto a suitable pickup conveyor or the like (not shown).

The inner support rollers 25 which support inner conveyor belt 34 are troughed in such manner that the outer and inner conveyor belts 14 and 34 maintain full contact at their edges throughout the curve. The amount of material which can be conveyed is limited to that which will not break through the seal at the belt edges. The spacing of the inner troughing rollers 25 must be close enough and the tension of the inner belt 34 must be sufficient to prevent belt edge sagging between the troughing rollers 25 which would allow escape of material. Tension of inner belt 34 is controlled by a hydraulic ram and take-up means or the like 39 attached to pulley 40 as previously explained. Prevention of escape of the material being conveyed and driving power on inner conveyor belt 34 is provided by the tension of outer conveyor belt 14.

In order to maintain proper tension on outer belt 14 during normal operating conditions, and also at the time of shutdown or loss of driving power for the belt conveyor system which could cause belt slack and consequent load material spillage in bight region B, a dual level tensioning means is provided for controlling the outer belt take-up tension applied to take-up pulley 22 in the return run of outer belt conveyor 14, as will now be explained in detail.

Figure 2:
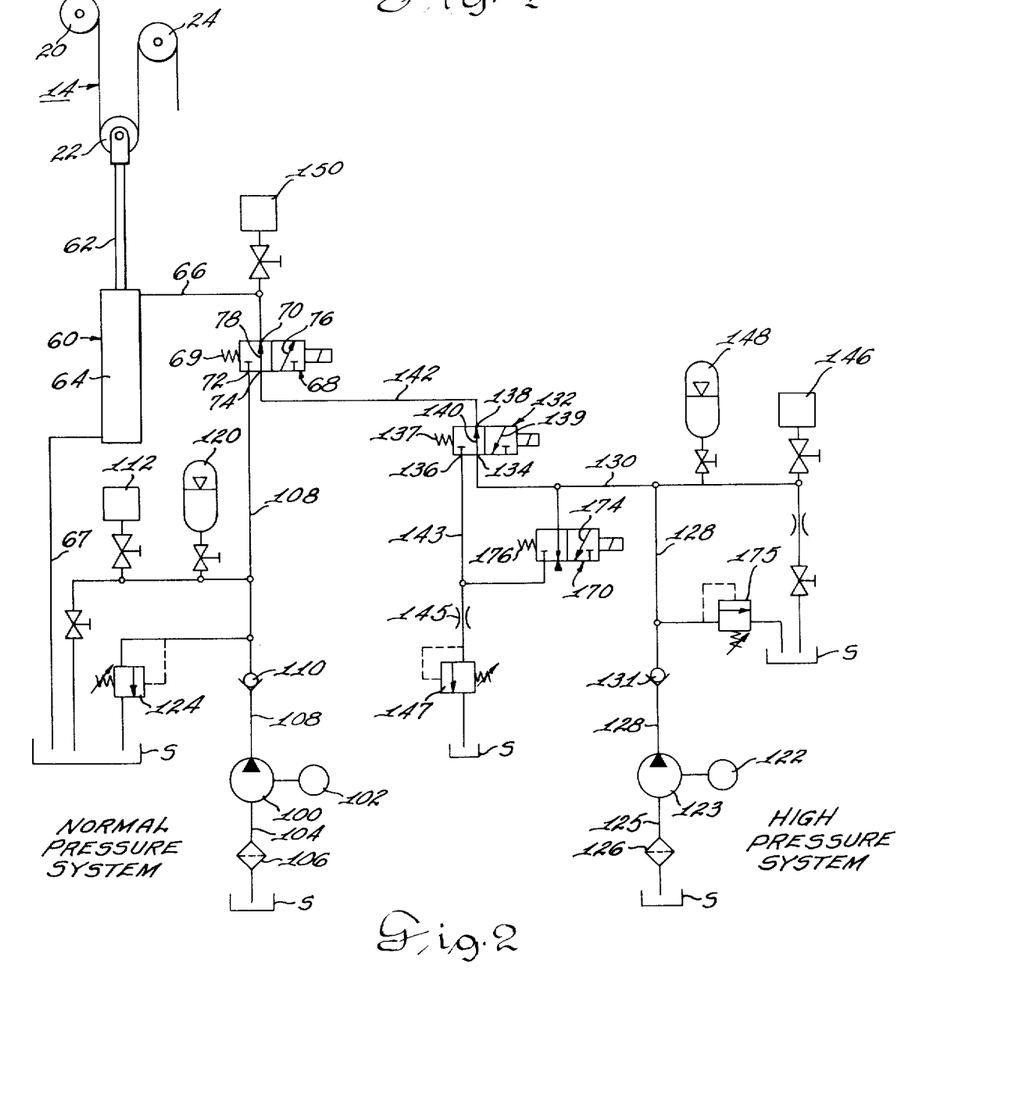
FIG. 2 is a schematic view of the tensioning apparatus and associated hydraulic circuitry used for applying normal tension to the outer belt of the dual belt conveyor-elevator during normal operation of the conveyor and for additionally providing a substantially increased tension to the outer belt of the dual belt conveyor-elevator effective on loss of power or shutdown of the conveyor system.

Two Pressure Level Hydraulic Take-Up System For Outer Belt of Dual Belt Conveyor-Elevator As can be seen in both FIGS. 1 and 2, the return run of outer belt conveyor 14 in passing from pulley 20 to pulley 24 passes over a take-up pulley 22 which is connected to the piston rod 62 of a hydraulic ram generally indicated at 60, the piston rod 62 being linearly movable in cylinder 64 of hydraulic ram 60.

As will be explained hereinafter in more detail and in accordance with the invention, hydraulic ram 60 is capable of being operated at two different hydraulic pressure levels whereby to selectively apply one or the other of the two different hydraulic pressure levels to the interior of the hydraulic cylinder 64 and thus to selectively apply one or the other of the two different tensioning levels to the take-up run of outer belt conveyor 14 depending upon the requirements of the belt conveyor system. In order to accommodate the additional total downward tensioning force requirements on take-up pulley 22 during the high pressure mode, as will be explained in more detail hereinafter, the internal diameter of hydraulic cylinder 64 is made greater than the diameter of cylinder 64 would be for operating only in the normal pressure mode, required during normal operation.

More specifically, during the normal operation of the dual belt conveyor-elevator 12 when inner and outer belt conveyor belts 34 and 14, respectively, are cooperating to transfer load material to the discharge point C, the "normal pressure system" is in effect whereby the hydraulic pressure interiorly of hydraulic cylinder 64 and exerted upon the head of piston 62 within cylinder 64 and thus upon take-up pulley 22 is of a lower order of magnitude such as, for example, to apply a tension force of 38 KIPS (38,000 pounds) on hydraulic cylinder rod 62. During normal operation, when the interior of hydraulic cylinder is subjected to the normal pressure mode, the tension applied to outer belt 14 by take-up pulley 22 should be sufficient to provide sufficient backside (or slack side) tension on belt 14 to apply the required driving tension of belt 14 relative to its drive pulley 16. If there were no backside (or slack side) tension on belt 14, the driving pulley 16 would slip and would be unable to provide any drive whatsoever. In the normal pressure mode of operation, the tension on outer belt 14 should also be sufficient to provide the minimum sealing tension required to maintain the load of bulk material sealed without spillage between the cooperating outer and inner belts 14 and 34. However, upon shutdown of the dual belt conveyor-elevator 12, while it is conveying bulk material, due to loss of power or due to intentional opening of the electrical circuit of the motor which drives the drive pulley 16 of outer belt conveyor 14, the hydraulic pressure applied to the interior of hydraulic cylinder 64 is automatically switched over to a higher pressure mode which may, for example, apply a tension force of 118 KIPS (118,000 pounds) to hydraulic cylinder rod 62. The dual belt conveyor-elevator 12 may be intentionally shut down, for example, while still conveying bulk material, because of overloading of the receiving facilities on shore.

As has previously explained, upon shutdown of the dual belt elevator conveyor (while conveying bulk material) due to loss of power or for other reasons, there is a tendency for slack to develop in outer belt conveyor 14, particularly in the region of the bight portion B (FIG. 1), which slack in the outer belt conveyor may tend to cause spillage of the conveyed material in the region of the bight portion B. Hence, the substantially immediate transfer to a higher hydraulic pressure mode in the hydraulic cylinder 64 with consequent greater tension force applied by take-up pulley 22 to the return run of outer belt conveyor 14 than during normal operation, will result in the slack in the outer conveyor belt 14 due to the power shutdown to be substantially immediately taken up, thereby avoiding any likelihood of spillage of the material being conveyed, particularly in bight region B (FIG. 1).

The hydraulic and electrical circuitry by means of which the foregoing normal pressure mode and high pressure mode can be selectively applied to hydraulic ram 60 will now be described, reference being made to the hydraulic circuitry shown in FIG. 2 of the drawings and to the schematic electrical circuitry shown in FIG. 3 of the drawings.

Figure 3:
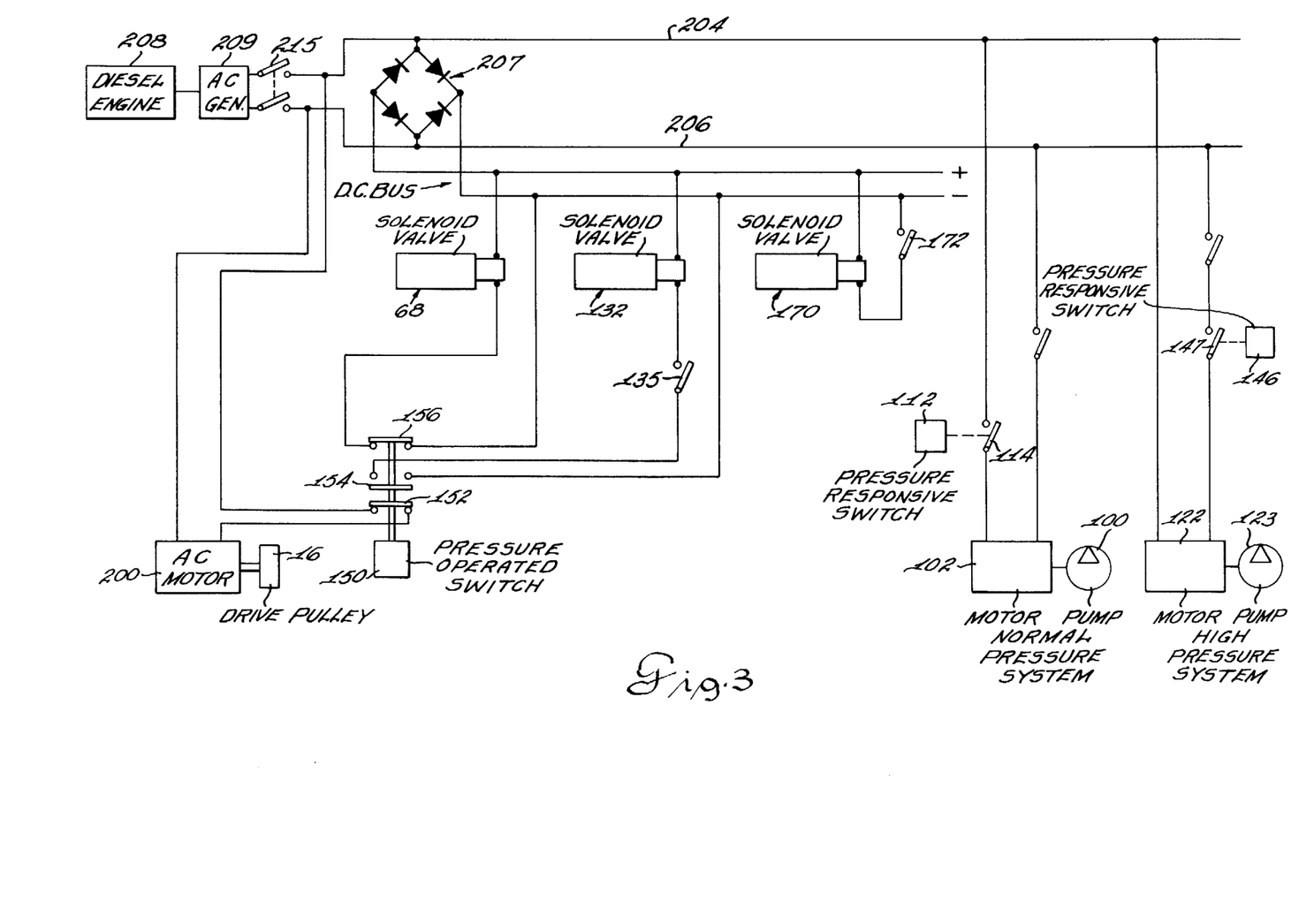
FIG. 3 is a schematic electric circuit diagram of the electrical circuitry associated with the dual belt conveyor-elevator system and the associated control system thereof.

Referring now to FIGS. 2 and 3, it will be noted that hydraulic cylinder 64, in which piston rod 62 is movable, has connected thereto at its upper end a hydraulic conduit 66 which is connected to port 70 of a directional solenoid valve generally indicated at 68. A piston (not shown) is connected to the lower end of piston rod 62 within hydraulic cylinder 64. The interior of hydraulic cylinder 64 beneath the piston is connected to sump S through hydraulic conduit 67. The connection of the lower end of cylinder 64 to sump by conduit 67 does not necessarily mean that the "blind end" of cylinder 64 (i.e., the space beneath the movable piston in cylinder 64) and the conduit 67 are necessarily filled with oil. The blind end of cylinder 64 might simply be airvented. If oil were to be used for the purpose of preventing corrosion in the cylinder. In the event oil is used on both sides of the piston in cylinder 64 (i.e., including the "blind end"), some provision would have to be made for back-filling the cylinder 64 at the blind end thereof. This could be done by using a separate low pressure high volume hydraulic pump (not shown), or by installing a separate gravity tank (not shown) for this purpose.

Solenoid valve 68 also includes two ports respectively indicated at 72 and 74. In the view shown in FIG. 2, solenoid valve 68 is shown in its electrically deenergized condition; however, if solenoid valve 68 is electrically energized, it will move against the pressure of biasing spring 69 to a position in which the internal valve passage represented by the inclined arrow 75 connects port 72 of valve 68 to valve port 70, in which case hydraulic ram 60 is connected to the "normal" hydraulic pressure system. However, if the directional solenoid valve 68 becomes deenergized, valve 68 is moved by spring 69 to the position shown in FIG. 2 of the drawings, in which the internal valve passage represented by the straight line arrow 78 will connect the port 74 of solenoid valve 68 to port 70 of solenoid valve 68 thereby connecting hydraulic ram 60 to the "high pressure" hydraulic system in which substantially increased tension, as compared to the normal operating tension, is applied to the return run of outer belt conveyor 14.

Description of Normal Pressure System

The normal pressure system comprises the pump 100 driven by an electric motor 102 (FIG. 2). The intake conduit 104 of pump 100 is connected in series with filter 106 and withdraws hydraulic fluid from sump S. The output conduit 108 of pump 100 is connected to inlet port 72 of the directional solenoid valve generally indicated at 68. A one-way ball check valve 110 is connected in series with output conduit 108 of pump 100 and permits hydraulic flow in the direction of directional solenoid valve port 72, but prevents reverse flow back to pump 100. A pressure switch generally indicated at 112 is provided and senses the hydraulic pressure in output conduit 108 of pump 100. Pressure switch 112 operates a differential switch 114 in the circuit of pump motor 102 (see FIG. 3) to maintain a substantially predetermined "normal" hydraulic pressure in pump output conduit 108. The pressure setting of pressure switch 112 of the normal pressure system determines the output pressure of the normal hydraulic pressure system available for application through directional solenoid valve 68 and input conduit 66 to cylinder 64 of hydraulic ram 60. As previously mentioned, this pressure may typically be of such order and magnitude as to apply a tension force of 38 KIPS (38,000 pounds) on hydraulic cylinder rod 62. An accumulator generally indicated at 120 (FIG. 2) is also connected in hydraulic communication with output conduit 108 of pump 100. In the normal pressure system, which is now being described, the accumulator 120 serves principally to absorb shock in the normal pressure system which may be induced by external mechanical forces onto the take-up hydraulic ram 60. Accumulator 120 also serves to make up for small hydraulic losses within the normal pressure hydraulic system, and thus aids in preventing pressure 112 switch from rapid on-off cycling. During normal operation in the normal pressure mode, the pressure of the gas in accumulator 120, and consequently the pressure of the hydraulic fluid in the normal pressure system is typically intended to be maintained at a pressure of plus or minus approximately 75 pounds per square inch. As long as the hydraulic pressure in the normal pressure system remains in this range, the take-up ram 60 and the piston rod 62 thereof will perform its required function of providing tractive tension of outer conveyor belt 14 relative to drive pulley 16 so that the drive pulley 16 will not slip relative to belt 14.

A relief valve generally indicated at 124 is also hydraulically connected to the pump output conduit 108 and is set to relieve hydraulic pressure in conduit 108 to sump S at a pressure slightly above the normal pressure maintained by pressure-operated differential switch 112.

Referring now to the schematic wiring diagram of FIG. 3, it will be seen that the electric motor 200 which drives the drive pulley 16 of outer belt conveyor 14 is electrically connected across the power supply lines 204 and 206 in series with a normally closed contact 152 operated by a pressure operated switch 150 to be described hereinafter.

Power supply lines or bus bars 204, 206 are the output conductors of an a.c. generator 209 driven by a diesel engine 208. A suitable on-off switch 215 is connected between the output of generator 209 and power lines 204, 206. The complete conveyor system may be shut down by opening switch 215 which connects generator 209 to bus bars 204, 206.

Assuming that switch 215 and contact 152 are closed, the electrical power supply from generator 209 energizes motor 200 to drive pulley 16 of outer belt conveyor 14, the inner conveyor belt 34 being frictionally driven in cooperative relation with outer belt 14 to convey the load material to discharge point C, as previously explained. A suitable gearbox or speed control mechanism (not shown) may be interposed between motor 200 and pulley 16, if required. With electrical power being supplied to bus bars 204, 206 by generator 209, the circuit of directional solenoid valve 68 is energized assuming the normally closed contact 156 operated by pressure operated switch 150 is closed, as will be described hereinafter. Energization of directional solenoid valve 68 moves solenoid valve 68 to a position in which internal valve passage 76 of solenoid valve 68 connects valve inlet port 72 to valve port 70, thereby connecting cylinder 64 of hydraulic ram 60 to the output pressure of pump 100 which is in the normal pressure system, through pump output conduit 108, directional solenoid valve 68 and conduit 66. The hydraulic circuit connection just described prevails under normal operating conditions when motor 200 is electrically energized to drive pulley 16 associated with outer conveyor belt 14.

It will be noted that if there is a complete failure of the electrical power supply to the conveyor system, or alternatively, if the power supply is interrupted as by an opening of switch 215, electrical power is removed not only from the motor 200 which drives drive pulley 16, but electrical power is also removed from the various solenoid valves 68, 132, 170 and from the pump motors 102 and 122 which are respectively associated with the normal pressure system and with the high pressure system. As seen in FIG. 3, solenoid valves 68, 132, 170, which are assumed to be direct current operated, are energized ffrom bus bars 204, 206 through a.c. to d.c. rectifier bank 207. Pump motors 102 and 122 are energized directly from bus bars 204, 206.

Description of High Pressure System

It should be understood that the high pressure system to be described is continuously ready on a "standby" basis to be connected to hydraulic ram 60 if necessary.

The high pressure system comprises a pump 123 which is driven by an electric motor 122. Pump 123 derives its input hydraulic fluid supply from sump S through intake conduit 125 in series with a filter 126. Output conduit 128 of pump 123 is connected by hydraulic conduit 130 to inlet port 134 of a directional solenoid valve generally indicated at 132 which is normally in the deenergized condition shown in the schematic hydraulic diagram of FIG. 2. It might be mentioned that directional solenoid valve 132 which should optionally be both manually and electrically operable is principally for "bleeding off" high pressure from the hydraulic ram cylinder 64 when it is desired to revert from high pressure operation to normal pressure operation as will be explained in more detail hereinafter. Hence when directional solenoid valve 132 is not being used to perform its "bleeding off" function, it is in the deenergized position shown in FIG. 2 of the drawings in which internal passage 140 of valve 132, represented by the straight line in FIG. 2, communicates inlet port 134 of valve 132 with port 138 of the valve, thereby communicating high pressure conduit 130 of the high pressure hydraulic system through directional solenoid valve 132 to connecting conduit 142 and thence to port 74 of directional solenoid valve 68 which in the electrically deenergized condition shown in FIG. 2 of the drawings is shown connecting the high pressure hydraulic system to hydraulic ram 60. When directional solenoid valve 132 is electrically deenergized, biasing spring 137 moves valve 132 to the position shown schematically in FIG. 2.

Conduit 128 of pump 123 is connected to conduit 130 in series with a one-way ball check valve 131 which permits the hydraulic output of pump 123 to flow through conduit 128 toward conduit 130, but prevents flow of hydraulic fluid in a reverse direction in conduit 128 back to pump 120.

A pressure switch generally indicated at 146 (FIGS. 2 and 3) is hydraulically connected to and senses the hydraulic pressure in conduit 130, and thus senses the hydraulic pressure in output conduit 128 of pump 123. Pressure switch 146 is set to maintain a predetermined high hydraulic pressure in output conduits 128 and 130. Pressure switch 146 includes a differential switch 147 (FIG. 3) which cycles motor 122 of pump 123 on and off as required to maintain the desired high hydraulic pressure in the high pressure system comprising accumulator 148, conduits 128 and 130. As previously mentioned, this high hydraulic pressure mode may be such as to apply a tension force of the order of magnitude of 118 KIPS (118,000 pounds) on hydraulic cylinder rod 62, as compared to the much lower tension force such as 38 KIPS (38,000 pounds) applied to hydraulic cylinder rod 62 by the "normal" pressure system.

A significant feature of the high pressure system is the provision of a hydraulic accumulator or accumulators indicated at 148 (only one accumulator is shown in FIG. 2) which is hydraulically connected to hydraulic conduit 130 and thus to hydraulic output conduit 128 of pump 123, whereby the hydraulic output of pump 123 can be stored in accumulator 148 under a pressurized gas cushion to provide an immediately available and adequate supply of high pressure hydraulic fluid for hydraulic ram 60 when the system connected to ram 60 is switched over from the normal presure system mode to the high pressure system or mode due to power loss or other interruption of power supply to drive motor 200 for drive pulley 16 of outer belt conveyor 14. A gas cushion is precharged in accumulator tank 148 above the level of the high pressure liquid therein and serves to eject the liquid stored in accumulator 148 through the hydraulic circuit path leading to hydraulic ram 60 when the belt conveyor take-up system is converted over to the high pressure mode of operation upon shutdown of the belt conveyor system due to loss of motive driving power for the conveyor system, as represented by opening of switch 215 which connects a.c. generator 209 to power lines or bus bars 204, 206.

Prior to installation the accumulator 148 is precharged with gas to a pressure below the final stabilized pressure which exists in the hydraulic circuit of the high pressure mode at the end of the downward belt-tensioning stroke of piston rod 62. In the high pressure mode the gas cushion above the liquid level in accumulator 148 forces the stored hydraulic fluid in accumulator 148 through the hydraulic circuit path comprising conduit 130, solenoid valves 132 and 68, and conduit 66 into the upper end of ram cylinder 64. Some hydraulic fluid will remain in the accumulator 148 at the end of the belt tensioning stroke of the piston rod 62 and thus the compressed gas in the accumulator will be at a higher pressure the the precharge pressure. The much greater tension exerted on belt 14 during the high pressure mode and transmitted to belt 14 through piston rod 62 and pulley 22 causes a stretching or elongation of belt 14 within its elastic limits and piston rod 62 must retract downwardly (relative to FIG. 2) into ram cylinder 64 to take up the stretch in belt 14. At the end of the downward expansion stroke of piston rod 62, the hydraulic pressure exerted from accumulator 148 to the interior of hydraulic cylinder and acting on piston rod 62 and belt 14 must still be sufficient to provide sufficient braking (i.e. —decelerating) action on the horizontal portion 17 of outer belt 14 which braking action is exerted back through the return run of the outer belt 14 to the head end (contiguous pulley 16) of the dual belt elevator to keep both inner and outer belts 12 and 14, respectively, in motion together as long as any coasting of the outer belt 14 continues, thereby avoiding any possibility of material spillage.

Referring to FIG. 3, it will be seen that loss of electrical power across bus bars 204, 206 as by opening of switch 215 or for other reason, causes stoppage of the driving action of drive pulley 16 of outer belt conveyor 14, and also causes deenergization of directional solenoid valve 68 as well ass deenergization of solenoid valves 132, 170, and of pump motors 102 and 122. Deenergization of directional solenoid valve 68 permits biasing spring 69 to move valve 68 to the position shown diagrammatically in FIG. 2 in which port 74 of valve 68 which is connected to the high pressure system is connected through internal valve passage 78 to port 70 of valve 68 and thus through conduit 66 to hydraulic ram 60. Under this condition of assumed loss of electrical power across bus bars 204, 206, as just mentioned, directional solenoid valve 132 which is also in the hydraulic circuit connecting the high pressure system to ram 60 is also in its electrically deenergized condition, as seen in FIG. 2, permitting hydraulic fluid flow from accumulator or accumulators 148 through hydraulic conduit 130, through inlet port 134 of valve 132, thence through internal passage 140 in valve 132 to port 138 of valve 132, and thence via conduit 142 to port 74 of directional solenoid valve 68, thence through passage 78 of valve 68 to port 70, and through conduit 66 to hydraulic cylinder 64. The large hydraulic capacity of accumulator 148 provides an almost immediate transfer of hydraulic fluid through the hydraulic circuit including directional solenoids 68 and 132 in the deenergized positions shown in FIG. 2, to the cylinder 64 of hydraulic cylinder 60 to effect the conversion from the normal pressure system to the high pressure system which is required upon the shutdown of the belt conveyor, all as previously described.

The increased tension applied to outer belt 14 during the high pressure mode during power shutdown of motor 200 which drives drive pulley 16 for belt 14 should be sufficient to accomplish the following: (1) to provide sufficient driving contact of outer belt 14 relative to inner belt 34 to cause the dual belt conveyor-elevator to continue to elevate the load between points B and C without spillage (FIG. 1) during the period of deceleration of the dual belt conveyor-elevator upon shutdown of the motive power of the dual belt conveyor-elevator; and (2) to provide the minimum required outer belt tension for proper sealing at pulley 48 in the region of bight B, whereby to take up slack in this region, and thereby to prevent load spillage in this region.

A relief valve 175 is provided in the high pressure system. Relief valve 175 senses the hydraulic pressure in output conduit 128 from pump 123 and is set to provide a pressure relief by-pass to sump S to prevent excessive hydraulic pressures reaching hydraulic ram 60, thereby avoiding overstretching of outer belt 14, and also preventing subjecting the conveyor structure to uncontrolled forces.

Bleed-Off Arrangement Before Returning to Normal Pressure Mode

Within a predetermined time interval, such as 30 seconds, for example, after hydraulic connection of the high pressure hydraulic system to the takeup hydraulic cylinder 64 upon shutdown of the electric drive power for the dual belt conveyor-elevator, it is desirable that a bleed-off of hydraulic cylinder 64 back to normal pressure be initiated and that the bleed-off procedure should be completed in a predetermined time interval such as approximately 30 to 45 seconds. For the purpose of controlling the bleed-off of take-up cylinder 64 back to normal operating pressure, directional solenoid valve 132 is provided. Directional solenoid valve 132 should optionally be manually operable, in case electrical power is not available on bus bars 204, 206.

As seen in FIG. 3, directional solenoid valve 132 is connected across the electrical power supply in series with an on-off switch 135 which may be manually operated and also in series with a normally open contact 154 operated by pressure operated switch 150 which will be described more fully hereinafter.

When take-up hydraulic cylinder 64 is connected to the high pressure hydraulic system as shown in the schematic diagram of FIG. 2 with directional solenoid valve 68 being in the position shown in FIG. 2 in which it connects the high pressure hydraulic system to hydraulic ram 60, if it is desired to bleed off the high pressure from take-up hydraulic cylinder 64, and assuming electric power is again available across bus bars 204, 206, manual switch 135 in the electrical circuit of directional solenoid valve 132 is closed to energize solenoid valve 132 through contact 154 operated by pressure switch 150, contact 154 being in a closed condition relative to the circuit of solenoid valve 132 when a high hydraulic pressure condition prevails interiorly of take-up hydraulic cylinder 64. Energization of directional solenoid valve 132 will move solenoid valve 132 to a position in which it is disconnected from high pressure hydraulic conduit 130 and in which port 136 of valve 132 is connected to internal valve passage 139 whereby to connect port 136 of valve 132 to port 138 of valve 132. The same movement of directional solenoid valve 132 which is accomplished by its electrical energization, as just described, should also be capable of being accomplished manually if electrical power is not available on bus bars 204, 206. This provides a "bleed-off" hydraulic circuit from hydraulic cylinder 64 through conduit 66, through directional solenoid valve 68 in the deenergized position shown in FIG. 2, through conduit 142, thence through directional solenoid valve 132 to port 136 of valve 132, thence through conduit 143 in series with restriction 145 and through relief valve 147 whenever pressure sensed by relief valve 147 is greater than the pressure maintained by pressure switch 112 of the normal pressure system, the bleed-off hydraulic liquid then passing to sump S.

When pressure-operated switch 150 which senses the hydraulic pressure in conduit 66 and thus in ram cylinder 64 senses a pressure in conduit 66 substantially greater than the normal pressure maintained in the normal pressure system it will (1) open contact 156 in the circuit of directional solenoid valve 68; (2) open the contact 152 in the circuit of pulley drive motor 200; and (3) will close the contact 154 in the energization circuit of solenoid valve 132.

Conversely, when the pressure-operated switch 150 which senses the hydraulic pressure in conduit 66 and thus in ram cylinder 64 senses a pressure substantially corresponding to the normal pressure maintained in the normal pressure system, the pressure operated switch will move the contacts 156, 154 and 152 to the positions shown in the schematic electrical circuit diagram of FIG. 3. Thus the closure of contact 156 in the circuit of directional solenoid valve 68, as shown in FIG. 3, permits reenergization of solenoid valve 68 when power lines or bus bars 204 and 206 are energized. The reclosure by pressure-operated switch 150 of contact 152 which is shown connected in the electrical energization circuit of motor 200 permits energization of motor 200 assuming bus bars 204 and 206 are electrically energized; and the opening by pressure-operated switch of contact 154 in the circuit of solenoid valve 132 permits "bleed-off" directional solenoid valve 132 to return to its unenergized position as shown in FIG. 2 in which directional solenoid valve 132 then provides a fluid flow path from the high pressure hydraulic system to conduit 142 leading to port 74 of directional solenoid valve 68 which controls hydraulic flow to take-up hydraulic cylinder 60. Thus, the movement of contacts 156, 154 and 152 by pressure operated switch 150 to the positions shown in FIG. 3 upon the sensing of a return to normal hydraulic pressure in cylinder 64, "sets up" the hydraulic and electrical circuitry for a return to normal operation of the dual belt conveyor-elevator and, at the same time, places the system in condition for a switch-over to the high pressure hydraulic take-up system should there by a loss of driving power to drive pulley 16.

It will be understood that in actual practice, the contact 152 controlled by pressure operated switch 150 which is shown connected in the electrical power supply circuit of motor 200 would normally be connected in a relay circuit which in turn would control a contact in the energization circuit of motor 200. However, to simplify the schematic wiring diagram, the contact 152 controlled by pressure operated switch 150 has been shown connected directly in the power supply circuit of motor 200.

Switch 135 in the circuit of directional solenoid valve 132 (FIG. 3) which was closed to initiate the "bleed-off" operation just described is opened either manually or by other appropriate means at the conclusion of the "bleed-off" operation when the hydraulic pressure in hydraulic cylinder 64 reverts to "normal pressure", to thereby cause "bleed-off" valve 132 to return to the position shown in FIG. 2.

In order to lower the pressure of the high pressure hydraulic system to the pressure level of the normal hydraulic pressure system for nonoperational periods, a directional solenoid valve 170 is provided. In FIG. 2, directional solenoid valve 170 is shown in a neutral position. If it is desired to lower the hydraulic pressure in the high pressure system to that of the normal pressure system for nonoperational periods, and assuming that bus bars 204, 206 are electrically energized, directional solenoid valve 170 is energized by closure of switch 172 (FIG. 3), moving valve 170 against the pressure of biasing spring 176 to a position in which internal passage 174 of valve 170 connects high pressure hydraulic conduit 130 to conduit 143 and thence through restriction 145 and relief valve 147 to sump S. As previously mentioned, relief valve 147 senses the hydraulic pressure condition in conduit 143 and moves to a fluid conducting position if the pressure sensed in conduit 143 exceeds the hydraulic pressure maintained by pressure switch 112 in the normal hydraulic pressure system. Therefore, when directional solenoid valve 170 is energized by closure of switch 172 (FIG. 3), it will provide a flow conduction path to sump S from conduit 130 through valve 170 and through conduit 143 and relief valve 147 as long as the hydraulic pressure sensed by relief valve 147 in conduit 143 exceeds the normal pressure maintained by pressure switch 112 in the normal pressure system.

SUMMARY OF OPERATION

During the normal operation of the dual belt conveyor-elevator, the outer conveyor belt 14 is driven by pulley 16 which in turn is driven by electric motor 200 (FIG. 3). The outer conveyor belt 14 frictionally drives the inner conveyor belt 34 in such manner that material such as bulk mineral ore or the like deposited on the horizontal run portion 17 of outer conveyor belt 14 will move into the bight portion in the region B (FIG. 1) between the outer and inner conveyor belts, the material being trapped between the surface of the belts and moved upwardly by the moving conveyor belts to the discharge point C.

During the normal operation of the dual belt conveyor-elevator comprising the inner and outer conveyor or-elevator belts 34 and 14, respectively, tension is applied to outer conveyor belt 14 by take-up pulley 22 which is connected to piston 62 of hydraulic ram 60 (FIG. 2). During normal operation of the dual belt conveyor-elevator, a "normal pressure system" is hydraulically connected through directional solenoid valve 68 to the interior of the hydraulic cylinder 64 of hydraulic ram 60 whereby to supply a "normal" operating tension to the outer conveyor belt 14 by means of take-up pulley 22. This normal pressure exerted on the piston within hydraulic ram 60 may be, for example, of the such order of magnitude as to apply a tension force of 38 KIPS (38,000 pounds) on hydraulic cylinder rod 62.

During the normal operation, as just described, directional solenoid valve 68 is electrically energized from generator output bus bars 204, 206 through rectifier bank 207, whereby solenoid valve 68 is maintained in a position in which it connects the normal pressure hydraulic system to cylinder 64 of hydraulic ram 60.

If the electric power supply from generator 209 to bus bars 204, 206 is interrupted for some reason, (either an emergency shutdown or a routine shutdown of the conveyor system) motor 200 which drives drive pulley 16 is deenergized and if there is a load of material on the horizontal run 17 of outer conveyor belt 14, the inertia of the load material on the horizontal portion 17 of the belt upon this loss of electrical power to drive motor 200, tends to cause a coasting of horizontal belt portion 17 with a resulting slack condition of outer conveyor belt 14 particularly in the region of bight portion B, which slack condition tends to cause spillage of load material. In order to avoid the tendency toward a slack condition of the outer conveyor belt 14 upon loss of electrical power to the belt drive system, there is provided in accordance with the invention as arrangement whereby substantially immediately upon loss of electric drive power to conveyor drive pulley 16 a high pressure hydraulic system comprising accumulator 148 is connected to the interior of hydraulic cylinder 64 of hydraulic ram 60 to thereby apply a substantially increased tension force to outer conveyor belt 14 by means of take-up pulley 22. The hydraulic pressure maintained by the high pressure system may be, for example, of such order of magnitude as to apply a tension force of 118 KIPS (118,000 pounds) on hydraulic cylinder rod 62. The manner in which the pressure interiorly of the hydraulic ram 60 is changed over to the high pressure mode from the normal pressure mode may be sumarized as follows: Loss of electrical power to bus bars 204, 206 and consequently to electric motor 200 which drives the drive pulley 16 results in the deenergization of directional solenoid valve 68 whereby to permit biasing spring 69 to move directional solenoid valve 68 to the deenergized position shown in FIG. 2 in which directional solenoid valve 68 provides a passage to hydraulic ram 60 for hydraulic fluid from the high pressure system through the normally deenergized directional solenoid valve (or "bleed-off" valve) 132 (FIG. 2), whereby to provide a direct hydraulic connection to high pressure hydraulic conduit 130 and thus to accumulator 148.

The application of the high pressure mode to hydraulic ram 60 results in an increased tensioning by take-up pulley 22 of outer conveyor belt 14 substantially immediately upon loss of power to pulley drive motor 200, the greatly increased tension of outer conveyor belt 14 in the high pressure mode eliminating the accumulation of slack in the bight region B of outer conveyor belt 14, as previously explained.

The hydraulic pressure in the normal pressure system is provided by a pump 100 driven by a motor 102, the motor 102 being electrically controlled by a pressure switch 112 (FIG. 2) which cycles the pump drive motor 102 on and off as required to maintain the predetermined desired "normal" hydraulic pressure in pump output line 108 leading to the directional solenoid valve 68. An accumulator 120 is provided in the normal pressure hydraulic system principally to absorb shock which may be induced by external mechanical forces on the hydraulic ram 60 and also to make up for any small hydraulic losses within the system, thereby aiding in minimizing rapid cycling by pressure control switch 112 of the normal pressure system.

In the high pressure system, a pump 123 driven by motor 122 supplies hydraulic fluid to hydraulically charge a large capacity accumulator or accumulators 148, the accumulator 148 having a gas cushion therein above the fluid level within the accumulator. The accumulator serves to provide a large supply of high pressure hydraulic fluid which is substantially immediately available for hydraulic transmission to the interior of hydraulic ram 60 to provide the high pressure mode operation upon the shutdown of pulley drive motor 200 (FIG. 3) in spite of the fact that under the loss of electrical power to bus bars 204 and 206 both pump normal and high pressure motors 102 and 122, respectively, are deenergized. When the system is electrically energized before shutdown occurs, the predetermined desired hydraulic pressure in the high pressure system required to adequately charge accumulator or accumulators 148 in the high pressure system is maintained by pressure switch 146 which cycles pump drive motor 122 on and off as required to maintain the desired hydraulic pressure in the high pressure system.

Within a relatively short predetermined time interval, such as thirty seconds after the application of the high pressure hydraulic mode to hydraulic ram 60 upon shutdown of the conveyor system, it is desirable to "bleed off" the high pressure in hydraulic ram cylinder 64 to permit the return to the normal pressure system. This bleeding-off action is accomplished by energizing (or manually operating, if electrical power is not yet available) directional solenoid valve 132 which connects hydraulic cylinder 64 through directional solenoid valve 68 in its unenergized condition, through hydraulic conduit 142 and through directional solenoid valve 132 in its energized (or, alternatively, manually operated) condition to sump S through pressure relief valve 147. With the hydraulic circuit just established, the hydraulic relief valve 147 will permit passage of high pressure hydraulic fluid from hydraulic cylinder 64 to sump S as long as the pressure in hydraulic conduit 143 sensed by relief valve 147 (FIG. 2) exceeds the normal pressure maintained by pressure switch 112 in the normal pressure system.

At the end of the bleed-off period just described, the pressure operated switch 150 senses a return to normal pressure in hydraulic conduit 66, switch 150 then returning contacts 156, 154 and 152 operated by pressure operated switch 150 to the positions shown in the schematic wiring diagram of FIG. 3 in which contact 152 is closed in the energization circuit of pulley drive motor 200 to permit reenergization of pulley drive motor 200 when electrical power becomes available, and in which contact 156 is closed in the circuit of directional solenoid valve 68 to permit reenergization of the circuit of directional solenoid valve 68 when electrical power on bus bars 204, 206 becomes available. Sensing a return to normal hydraulic pressure in conduit 66 also causes pressure-operated switch 150 to move contact 154 in the circuit of directional solenoid valve 132 to an open position as shown in FIG. 3 in which "bleed-off" directional solenoid valve 132 cannot be energized when electric power becomes available on bus bars 204, 206. As schematically shown by the position of solenoid valve 132 in the hydraulic circuit diagram of FIG. 2, this position of solenoid valve 132 places the high pressure hydraulic system in readiness for connection to hydraulic ram 60 as required.

In order to lower the pressure of the high pressure system to the pressure level of the normal pressure hydraulic system for nonoperational periods, directional solenoid valve 170 (FIG. 2) is energized, assuming electrical power is available across bus bars 204, 206, causing valve 170 to connect high pressure hydraulic conduit 130 to sump S through conduit 143 and through relief valve 147 as long as relief valve 147 senses that the hydraulic pressure in conduit 143 is in excess of the normal pressure maintained by pressure differential switch 112 in the normal pressure system.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A dual belt conveyor-elevator for conveying loose bulk material from one level to a higher level, comprising first and second endless belt conveyors extending between respective pairs of pulleys disposed contiguous the respective levels and providing for each conveyor a forward run and a return run, the forward run of the first belt conveyor including an upwardly facing substantially horizontal entry portion, the forward run of the second belt conveyor including a downwardly facing entry portion defining with a portion of said entry portion of said first belt conveyor a bight between the conveyors to receive loose bulk material therebetween and to be elevated thereby, the respective forward runs of said first and said second belt conveyors being normally maintained in fact-to-face edge sealing engagement substantially from the region where the loose bulk material is received between said belt conveyors at said bight to a discharge of said belt conveyors at said high level, and means for applying two different tensioning modes to said first belt conveyor including a first tensioning mode in which a normal tension is applied to said first belt conveyor during normal operation of said dual belt conveyor-elevator, and a second tensioning mode in which a substantially higher tension than said normal tension is applied to said first belt conveyor effective substantially immediately upon loss of motive power to said conveyor-elevator, whereby to substantially prevent accumulation of slack in said first conveyor belt upon said loss of motive power and thereby minimizing spillage of material from between said belt conveyors upon said loss of motive power.

2. A dual belt conveyor-elevator as defined in claim 1 in which said means for applying said two different tensioning modes to said first belt conveyor is engageable with said return run of said first conveyor.

3. A dual belt conveyor-elevator as defined in claim 1 in which said means for applying two different tensioning modes to said first belt conveyor comprises a fluid motor, first fluid circuit means for applying a predetermined fluid pressure to said fluid motor during normal operation of said dual belt conveyor-elevator, second fluid circuit means connectible in substitution of said first fluid circuit means to said fluid motor substantially immediately upon loss of motive power to said dual belt conveyor-elevator for applying to said fluid motor a fluid pressure substantially higher than said predetermined fluid pressure, and means associating said fluid motor with said first belt conveyor whereby said fluid motor applies to said first belt conveyor one or the other of said two tensioning modes in accordance with the one or the other of said fluid pressures applied to said fluid motor.

4. A dual belt conveyor-elevator as defined in claim 3 in which said fluid motor is a hydraulic ram, said hydraulic ram including a cylinder and a piston movable in said cylinder, said first belt conveyor engaging a take-up pulley, and means connecting said piston to said take-up pulley whereby to apply a tensioning force to said first belt conveyor in accordance with one or the other of said two tensioning modes.

5. A dual belt conveyor-elevator as defined in claim 3 including fluid pump means in said second fluid circuit means for pumping fluid in said second fluid circuit means, said second fluid circuit means comprising a fluid accumulator connected to receive and store fluid pumped by said fluid pump means and to release said stored fluid to said fluid motor upon connection of said second fluid circuit means to said fluid motor.

6. A dual belt conveyor-elevator as defined in claim 5 in which a hydraulic fluid is pumped by said fluid pump means into said accumulator, and comprising a gas cushion above the level of the hydraulic fluid in said accumulator for the purpose of forcing said hydraulic fluid into said fluid motor whereby to cause said fluid motor to apply said second tensioning mode to said first belt conveyor substantially immediately upon loss of motive power to said conveyor-elevator.

7. A dual belt conveyor-elevator as defined in claim 6 in which said fluid motor is a hydraulic ram having a cylinder and a piston movable in said cylinder, said piston being operatively connected to said first belt conveyor, and in which said gas cushion above the liquid level in said accumulator is precharged to a predetermined initial pressure and in which said accumulator is proportioned relative to said hydraulic ram to effect movement of said piston in said cylinder as required by the elongation of said first belt conveyor upon the application of said second tensioning mode to said first belt conveyor.

8. A dual belt conveyor-elevator as defined in claim 2 comprising a first fluid pump in said first fluid circuit means, means for regulating said first fluid pump to maintain a predetermined normal pressure in said first fluid circuit means, a second fluid pump in said second fluid circuit means, and means for regulating said second fluid pump to maintain in said second fluid circuit means a fluid pressure substantially higher than said predetermined normal pressure or said first fluid circuit means.

9. A dual belt conveyor-elevator for conveying loose bulk material from one level to a higher level, comprising first and second endless belt conveyors extending between respective pairs of pulleys disposed contiguous the respective levels and providing for each conveyor a forward run and a return run, the forward run of the first belt conveyor including an upwardly facing substantially horizontal entry portion, a downwardly facing upwardly inclined terminal portion, and a concavely curved intermediate portion, the forward run of the second belt conveyor including a downwardly facing entry portion defining with a portion of said entry portion of said first belt conveyor a bight between the conveyors to receive loose bulk material therebetween and be elevated thereby, the forward run of said second belt conveyor including an upwardly facing and upwardly inclined terminal portion terminating at the higher level and a convexly curved intermediate portion, the respective forward runs of said first and said second belt conveyors being normally maintained in fact-to-face edge sealing engagement substantially from the region where the loose bulk material is received between said belt conveyors at said bight to the termination of said terminal portions of said belt conveyors at said higher level, and means for applying two different tensioning modes to said first belt conveyor including a first tensioning mode in which a normal tension is applied to said first belt conveyor during normal operation of said dual belt conveyor-elevator, and a second tensioning mode in which a substantially higher tension than said normal tension is applied to said first belt conveyor effective substantially immediately upon loss of motive power to said conveyor-elevator, whereby to substantially prevent accumulation of slack in said first belt conveyor upon said loss of motive power, and thereby minimizing spillage of material from between said belt conveyors upon said loss of motive power.

10. A dual belt conveyor-elevator as defined in claim 9 in which said means for applying said two different tensioning modes to said first belt conveyor is engageable with said return of said first belt conveyor.

11. A dual belt conveyor-elevator as defined in claim 9 in which said means for applying two different tensioning modes to said first belt conveyor comprises a fluid motor, first fluid circuit means for applying a predetermined fluid pressure to said fluid motor during normal operation of said dual belt conveyor-elevator, second fluid circuit means connectible in substitution of said first fluid circuit means to said fluid motor substantially immediately upon loss of motive power to said dual belt conveyor-elevator for applying to said fluid motor a fluid pressure substantially higher than said predetermined fluid pressure, and means associating said fluid motor with said first belt conveyor whereby said fluid motor applies to said first belt conveyor one or the other of said two tensioning modes in accordance with the one or the other of said fluid pressures applied to said fluid motor.

12. A dual belt conveyor-elevator ad defined in claim 11 in which said fluid motor is a hydraulic ram, said hydraulic ram including a cylinder and a piston movable in said cylinder, said first belt conveyor engaging a take-up pulley, and means connecting said piston to said take-up pulley whereby to apply a tensioning force to said first belt conveyor in accordance with one or the other of said two tensioning modes.

13. A dual belt conveyor-elevator as defined in claim 11 including fluid pump means in said second fluid circuit means for pumping fluid in said second fluid circuit means, said second fluid circuit means comprising a fluid accumulator connected to receive and store fluid pumped by said fluid pump means and to release said stored fluid to said fluid motor upon connection of said second fluid circuit means to said fluid motor.

14. A dual belt conveyor-elevator as defined in claim 13 in which a hydraulic fluid is pumped by said fluid pump means into said accumulator, and comprising a gas cushion above the level of the hydraulic fluid in said accumulator for the purpose of forcing said hydraulic fluid into said fluid motor whereby to cause said fluid motor to apply said second tensioning mode to said first belt conveyor substantially immediately upon loss of motive power to said conveyor-elevator.

15. A dual belt conveyor-elevator as defined in claim 11 comprising a first fluid pump in said first fluid circuit means, means for regulating said first fluid pump to maintain a predetermined normal pressure in said first fluid circuit means, a second fluid pump in said second fluid circuit means, and means for regulating said second fluid pump to maintain in said second fluid circuit means a fluid pressure substantially higher than said predetermined normal pressure of said first fluid circuit means.

16. A dual belt conveyor-elevator for conveying loose bulk material from one level to a higher level, comprising first and second endless belt conveyors extending between respective pairs of pulleys disposed contiguous the respective levels and providing for each conveyor a forward run and a return run, the forward run of the first belt conveyor including an upwardly facing substantially horizontal entry portion, the forward run of the second belt conveyor including a downwardly facing entry portion defining with a portion of said entry portion of said first belt conveyor a bight between the conveyors to receive loose bulk material therebetween and to be elevated thereby, said dual belt conveyor-elevator comprising an elevating zone extending substantially from said bight to a discharge of said belt conveyors at said higher level, said elevating zone comprising a curved portion in the lower portion of said elevating zone adjacent said bight, said first belt conveyor being adapted to be held in tension against said second belt conveyor in said curved portion of said elevating zone, the respective forward runs of said first and said second belt conveyors being normally maintained in fact-to-face edge sealing engagement substantially from the region where the loose bulk material is received between said belt conveyors at said bight to a discharge of said belt conveyors at said higher level, and means for applying two different tensioning modes to said first belt conveyor including a first tensioning mode in which a normal tension is applied to said first belt conveyor during normal operation of said dual belt conveyor-elevator, and a second tensioning mode in which a substantially higher tension than said normal tension is applied to said first belt conveyor effective substantially immediately upon loss of motive power to said conveyor-elevator, whereby to substantially prevent accumulation of slack in said first conveyor belt upon said loss of motive power and thereby minimizing spillage of material from between said belt conveyors upon said loss of motive power.

17. A dual belt conveyor-elevator as defined in claim 16 in which said means for applying said two different tensioning modes to said first belt conveyor is engageable with said return run of said first conveyor.

18. A dual belt conveyor-elevator as defined in claim 16 in which said means for applying two different tensioning modes to said first belt conveyor comprises a fluid motor, first fluid circuit means for applying a predetermined fluid pressure to said fluid motor during normal operation of said dual belt conveyor-elevator, second fluid circuit means connectible in substitution of said first fluid circuit means to said fluid motor substantially immediately upon loss of motive power to said dual belt conveyor-elevator for applying to said fluid motor a fluid pressure substantially higher than said predetermined fluid pressure, and means associating said fluid motor with said first belt conveyor whereby said fluid motor applies to said first belt conveyor one or the other of said two tensioning modes in accordance with the one or the other of said fluid pressures applied to said fluid motor.

19. A dual belt conveyor-elevator as defined in claim 18 in which said fluid motor is a hydraulic ram, said hydraulic ram including a cylinder and a piston movable in said cylinder, said first belt conveyor engaging a take-up pulley, and means connecting said piston to said take-up pulley whereby to apply a tensioning force to said first belt conveyor in accordance with one or the other of said two tensioning modes.

20. A dual belt conveyor-elevator as defined in claim 18 including fluid pump means in said second fluid circuit means for pumping fluid in said second fluid circuit means, said second fluid circuit means comprising a fluid accumulator connected to receive and store fluid pumped by said fluid pump means and to release said stored fluid to said fluid motor upon connection of said second fluid circuit means to said fluid motor.

21. A dual belt conveyor-elevator as defined in claim 20 in which a hydraulic fluid is pumped by said fluid pump means into said accumulator, and comprising a gas cushion above the level of the hydraulic fluid in said accumulator for the purpose of forcing said hydraulic fluid into said fluid motor whereby to cause said fluid motor to apply said second tensioning mode to said first belt conveyor substantially immediately upon loss of motive power to said conveyor-elevator.

22. A dual belt conveyor-elevator as defined in claim 21 in which said fluid motor is a hydraulic ram having a cylinder and a piston movable in said cylinder, said piston being operatively connected to said first belt conveyor, and in which said gas cushion above the liquid level in said accumulator is precharged to a predetermined initial pressure and in which said accumulator is proportioned relative to said hydraulic ram to effect movement of said piston in said cylinder as required by the elongation of said first belt conveyor upon the application of said second tensioning mode to said first belt conveyor.

23. A dual belt conveyor-elevator as defined in claim 18 comprising a first fluid pump in said first fluid circuit means, means for regulating said first fluid pump to maintain a predetermined normal pressure in said first fluid circuit means, a second fluid pump in said second fluid circuit means, and means for regulating said second fluid pump to maintain in said second fluid circuit means a fluid pressure substantially higher than said predetermined normal pressure of said first fluid circuit means.

* * * * *